United States Patent
Fujiyama et al.

(10) Patent No.: US 7,283,929 B2
(45) Date of Patent: Oct. 16, 2007

(54) PLANT APPARATUS OPERATION SUPPORT DEVICE

(75) Inventors: Kazunari Fujiyama, Kanagawa-Ken (JP); Toshihiro Fujiwara, Kanagawa-Ken (JP); Kazuhiro Saito, Kanagawa-Ken (JP); Taiji Hirasawa, Kanagawa-Ken (JP); Satoshi Nagai, Kanagawa-Ken (JP); Hitoshi Kichise, Kanagawa-Ken (JP); Mitsuyoshi Okazaki, Saitama-Ken (JP); Hirotsugu Kodama, Tokyo (JP); Masanori Minowa, Tokyo (JP); Takayuki Iwahashi, Kanagawa-Ken (JP); Yasunari Akikuni, Kanagawa-Ken (JP); Masao Arimura, Kanagawa-Ken (JP); Kentaro Takagi, Kanagawa-Ken (JP); Seiichi Asatsu, Kanagawa-Ken (JP); Shigeru Harada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/525,754

(22) Filed: Sep. 26, 2005

(65) Prior Publication Data

US 2006/0100915 A1    May 11, 2006

(30) Foreign Application Priority Data

Aug. 30, 2002 (JP) ............................. 2002-255278

(51) Int. Cl.
*G06F 9/44* (2006.01)
(52) U.S. Cl. .................................................... 702/182
(58) Field of Classification Search ............... 702/182, 702/81
See application file for complete search history.

(56) References Cited

U.S. PATENT DOCUMENTS 6,381,508 B1 * 4/2002 Marrie ..................... 700/96

FOREIGN PATENT DOCUMENTS

| JP | 08-234832 | 9/1996 |
| JP | 09-160635 | 6/1997 |
| JP | 2000-259222 | 9/2000 |

OTHER PUBLICATIONS

Kihara et al., "Maintenance Technique Using RBI/RBM," Nippon Kogyo Publishing (Dec. 2000), pp. 76-79, and English-language translation thereof.

* cited by examiner

*Primary Examiner*—Tung S. Lau
(74) *Attorney, Agent, or Firm*—Finnegan, Henderson, Farabow, Garrett & Dunner, L.L.P.

(57) ABSTRACT

An operation-supporting apparatus includes: an operation request input unit that inputs information relating to operation request items of plant equipment; an operating conditions setting unit that converts operation request input information to operating parameters; an operation history creation unit that creates an operation history by chronologically processing the operating parameters; a breakdown statistics database that stores an event tree of the plant equipment; an event simulator that calculates the degree of unreliability corresponding to the operating parameters, the operation request information, and the operation history information, and in compliance with the event tree; a risk-cost calculation unit that calculates risk-cost by determining the aggregate product of the degrees of unreliability and restoration costs; an operating method determination unit that determines whether operating conditions are suitable by comparing the risk-cost with profit gained by continuing operation; and an operating method specification unit that specifies specific operation conditions for the plant equipment.

16 Claims, 14 Drawing Sheets

PLANT APPARATUS OPERATION SUPPORT DEVICE

CROSS-REFERENCE TO RELATED APPLICATIONS

This application is based upon and claims the benefit of priority from the Japanese Patent Application No. 2002-255278, filed on Aug. 30, 2002, the entire contents of which are incorporated herein by reference.

BACKGROUND OF THE INVENTION

1. Field of the Invention

This invention relates to an operation-supporting apparatus that supports operation and preservation-maintenance of plant equipment, starting with a steam turbine in a thermal power plant, while considering risks relating to breakage, deteriorating performance, and functional stoppage.

2. Description of the Related Art

In thermal power plants and the like, measures to deal with flexible operations, such as rapid start-up and fluctuating load, are required in order to use energy effectively. Breakdown and malfunction of plant equipment must be prevented while keeping preservation maintenance as inexpensive as possible.

To meet these demands, methods have been established to select an optimal operating pattern for the plant. One, conceivable method is a risk-based technique of quantitatively evaluating and comparing advantages and risks of the operating pattern.

While a preservation-maintenance method based on risk-cost evaluation has previously been disclosed (by Kihara et al in "Piping Technology" December 2000, pp. 76-79, published by Nippon Kogyo Publishing), an apparatus capable of optimizing plant operations has not.

SUMMARY OF THE INVENTION

The present invention has been realized in consideration of the points described above, and aims to provide an apparatus that estimates the risk-cost due to damage, deterioration, and functional stoppage, of equipment in a plant, and selects an optimal operating method while comparing the risk-cost with profit gained by operation.

In order to achieve these objects, a first aspect of the invention provides an operation-supporting apparatus for plant equipment, comprising an operation request input unit that inputs information relating to operation request items of the plant equipment; an operating conditions setting unit that converts operation request input information, input by the operation request input unit, to operating parameters; an operation history creation unit that creates an operation history by chronologically processing the operating parameters, converted by the operating conditions setting unit, based on input from an operation monitoring unit that monitors operating states of the plant equipment; a breakdown statistics database that stores an event tree of the plant equipment in correlation with degrees of unreliability relating to breakdown events; an event simulator that calculates the degree of unreliability corresponding to the operating parameters, based on the information in the breakdown statistics database, the operation request information, and the operation history information, and in compliance with the event tree of the plant equipment; a risk-cost calculation unit that calculates risk-cost by determining the aggregate product of the degrees of unreliability and restoration costs in compliance with the event tree; an operating method determination unit that determines whether operating conditions are suitable by comparing the risk-cost with profit that is expected to be gained by continuing operation; and an operating method specification unit that specifies specific operation conditions for the plant equipment in accordance with the operating method determined by the operating method determination unit. This makes it possible to determine online whether operation request items of plant equipment can be realized, and specify the necessary operating method.

In the operation-supporting apparatus for plant equipment according to a second aspect, the operation monitoring unit includes detectors that detect all or some of the temperature and pressure of operational fluids, number of rotations of rotating parts, and output load, of plant equipment. The operation monitoring unit chronologically processes the detected, signals, arranges regular and irregular operations into predetermined categories, and collects and stores data that relates to number of start-ups and operating times, enabling a detailed operation history of the plant to be created automatically.

In the operation-supporting apparatus for plant equipment according to a third aspect, the breakdown statistics database uses an event tree, that is based on previous breakdown events in the plant and/or other similar plants and relates to cracks, deformation, erosion, abrasion, oxidation, corrosion, deterioration of materials, breakage, reduced capability, and functional deterioration, and a degree of unreliability function for each event. These are expressed as a function of material lifetime, parameters in correspondence with operation conditions, or as a function of parameters of temperature, stress, warping, and environmental factors, that represent operating conditions. This enables events to be simulated and risk-cost calculated for various types of operating states.

The operation-supporting apparatus for plant equipment according to a fourth aspect further comprises a breakdown monitoring unit that detects breakdown events while the plant equipment is operational and precursory breakdown events, and an emergency stop determination unit that determines whether to stop operation immediately based on a detection signal detected by the breakdown monitoring unit. When not immediately stopping operation, the probability of an event that already occurred in the event tree stored in the breakdown statistics database is corrected from a pre-event probability to a post-event probability, and in addition, a subsequent event is corrected by using the post-event probability of the event that already occurred, and the event simulator uses a corrected degree of unreliability. Therefore, accurate risk-cost can be evaluated even when some sort of breakdown event or precursory breakdown event has occurred, enabling an appropriate operating method to be selected.

In the operation-supporting apparatus for plant equipment according to a fifth aspect, the breakdown monitoring unit detects all or some of member temperature, warping/displacement, vibration, lubricating oil temperature, changes in lubricating oil components, partial thermal efficiency, plant efficiency, operational fluid leaks, operation sound, and acoustic emission signals, of plant equipment, and sends information, that indicates whether a breakdown event or a precursory breakdown event has occurred, to the emergency stop determination unit and the breakdown statistics database. This makes it possible to accurately identify breakdown events and precursory breakdown events, and supply information required in determining the operating method.

The operation-supporting apparatus for plant equipment according to a sixth aspect further comprises an inspection unit that inspects breakdown events and precursory breakdown events of equipment members while the plant equipment has stopped operating. Information relating to the occurrence of breakdown events and precursory breakdown events detected by the inspection unit is transmitted to the breakdown statistics database, and a degree of unreliability function is corrected to post-event probability. In cases where the operating method determination unit determines that operation cannot restart and that operation is possible only under certain conditions, a repair method is selected, the degree of unreliability in the breakdown statistics database being changed when the repairs have been carried out, another simulation is executed and the operating method determination unit makes a determination. Therefore, an optimal operating method that includes preservation management can be determined based on an evaluation of the risk-cost.

In the operation-supporting apparatus for plant equipment according to a seventh aspect, the inspection unit uses all or some of a CCD camera, an ultrasonic sensor, an electric resistance sensor, and an electromagnetism sensor, to measure all or some of cracks, warping/displacement, erosion, abrasion, oxidation, corrosion, and breakage, of plant equipment. This enables breakdown events and precursory breakdown events of equipment to be accurately reflected in the risk-cost evaluation to determine an accurate operating method.

The operation-supporting apparatus for plant equipment according to an eighth aspect further comprises a probability theory lifetime evaluation unit that calculates a lifetime evaluation by appending probabilities to lifetimes of plant equipment with respect to creeping and fatigue by using material lifetime characteristics, stored beforehand in a statistical material database, and the probability distribution thereof, based on operation history information and operation request input information that relates to the plant equipment. A degree of unreliability function is calculated from the lifetime evaluation, determined by the probability theory lifetime evaluation unit, stored in the breakdown statistics database, and used in calculations made by the event simulator. Therefore, the degree of unreliability of an event can be estimated in the stage of deterioration and damage preceding a breakdown event, and applied in the risk-cost evaluation.

The operation-supporting apparatus for plant equipment according to a ninth aspect further comprises a deterioration/damage measuring unit that calculates values for material deterioration and material damage of equipment members while the plant equipment has stopped operating. Statistical material data, that is required in the evaluation processing of the probability theory lifetime evaluation unit, is determined from the deterioration/damage measurements obtained from the deterioration/damage measuring unit. This makes it possible to determine a lifetime evaluation and a degree of unreliability function that are highly precise, and reflect the state of the plant equipment following years of usage.

In the operation-supporting apparatus for plant equipment according to a tenth aspect, the deterioration/damage measuring unit uses all or some of a hardness measuring unit, an electromagnetism measuring unit, a sampling unit, a replica-collecting unit, and an electric resistance measuring unit, to measure softening, fragility, creep void, cracks, deformation, and warping, of equipment members. This makes it possible to determine a lifetime evaluation and a degree of unreliability function that are highly precise, and reflect the state of the plant equipment following years of usage.

In the operation-supporting apparatus for plant equipment according to an eleventh aspect, information from a plurality of the operation monitoring units and the breakdown monitoring units, provided for respective plants, and information output from a plurality of the operating method determination units, provided for respective plants, are transmitted via a network. This enables risk-cost to be evaluated while monitoring a plurality of plants, and provide optimal operation for the entire group of plants.

DETAILED DESCRIPTIONS

EMBODIMENT 1

Figure 1:
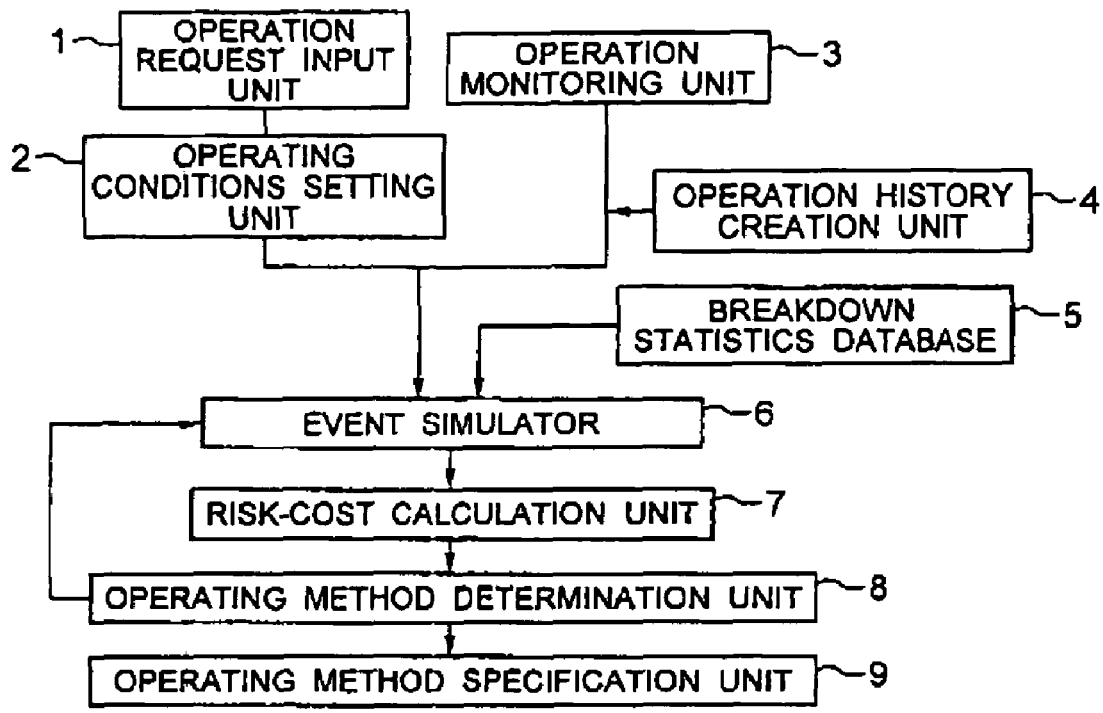
FIG. 1 is a block line diagram of the constitution of a first aspect of this invention.

FIG. 1 is a constitution of a first embodiment of the present invention. The first embodiment includes an operation request input unit 1, an operating conditions setting unit 2, an operation monitoring unit 3, an operation history creation unit 4, a breakdown statistics database 5, an event simulator 6, a risk-cost calculation unit 7, an operating method determination unit 8, and an operating method specification unit 9.

The operation request input unit 1 of FIG. 1 inputs information relating to accomplishment times of requests output from the plant, and start and stop schedules, via a device such as a terminal.

Figure 2:
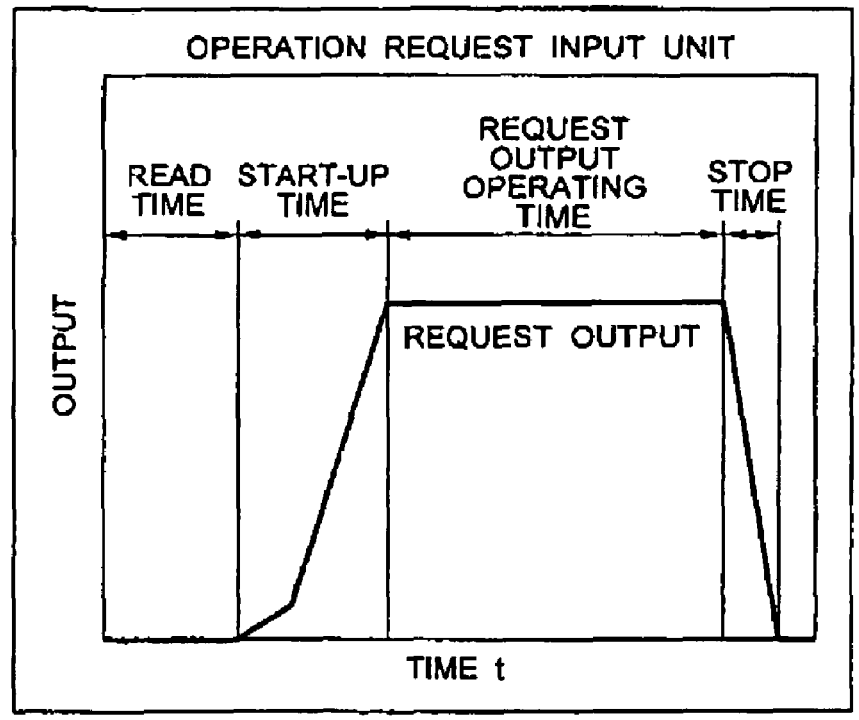
FIG. 2 is a diagram explaining an example of operation request input in a first embodiment of this invention.

FIG. 2 is a graph of contents input by the operation request input unit 1. The information of FIG. 2 relates to read time, start time, request output operating time, and stop time, and is input by the operation request input unit 1.

Figure 3:
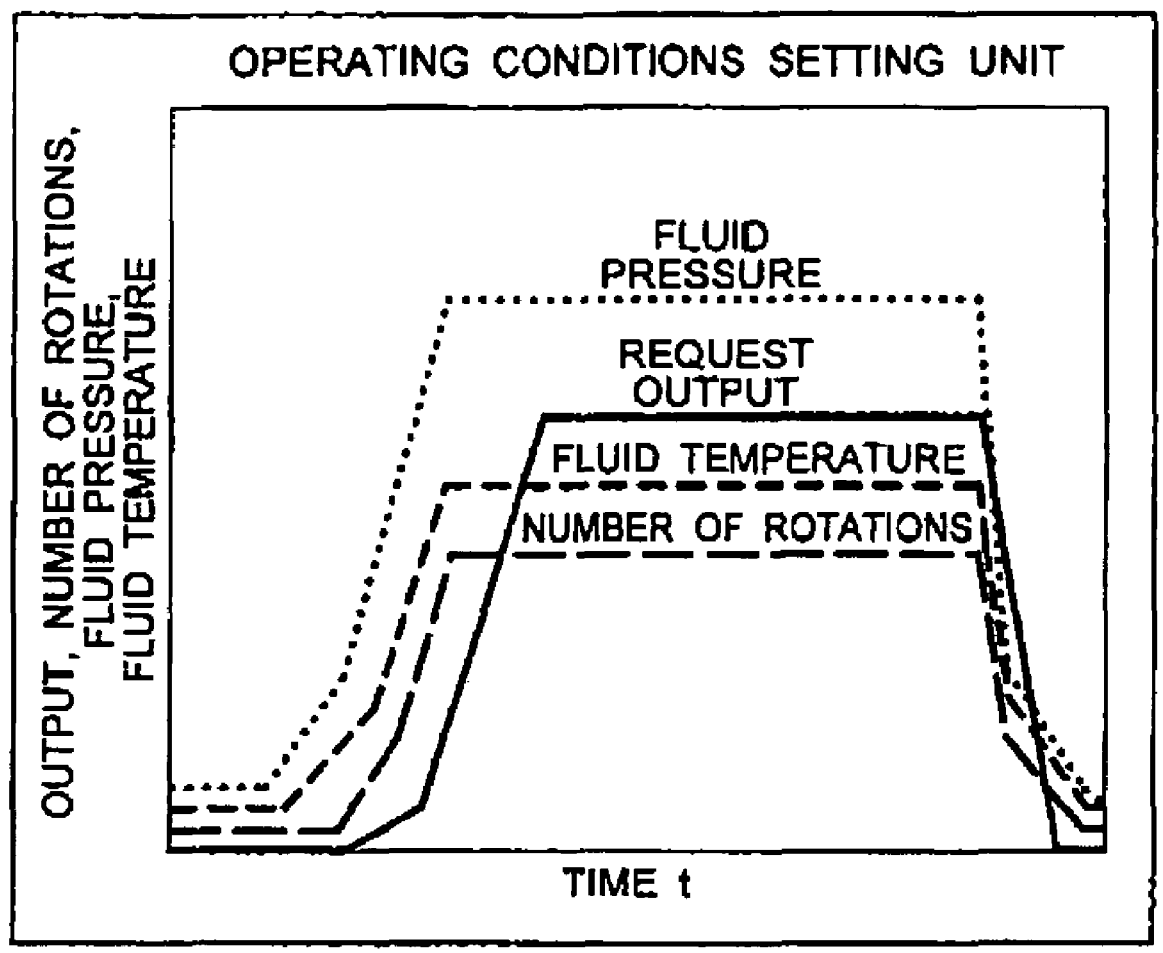
FIG. 3 is a diagram explaining an example of setting operating conditions.

FIG. 3 depicts functions of the operating conditions setting unit 2 in FIG. 1. The operating conditions setting unit 2 converts the input operation request information to operating parameters, quantifies them, and, as shown in FIG. 3, supplies data that changes over time for values such as fluid pressure, fluid temperature, and the number of rotations of a rotating section, to a subsequent processor.

Figure 4:
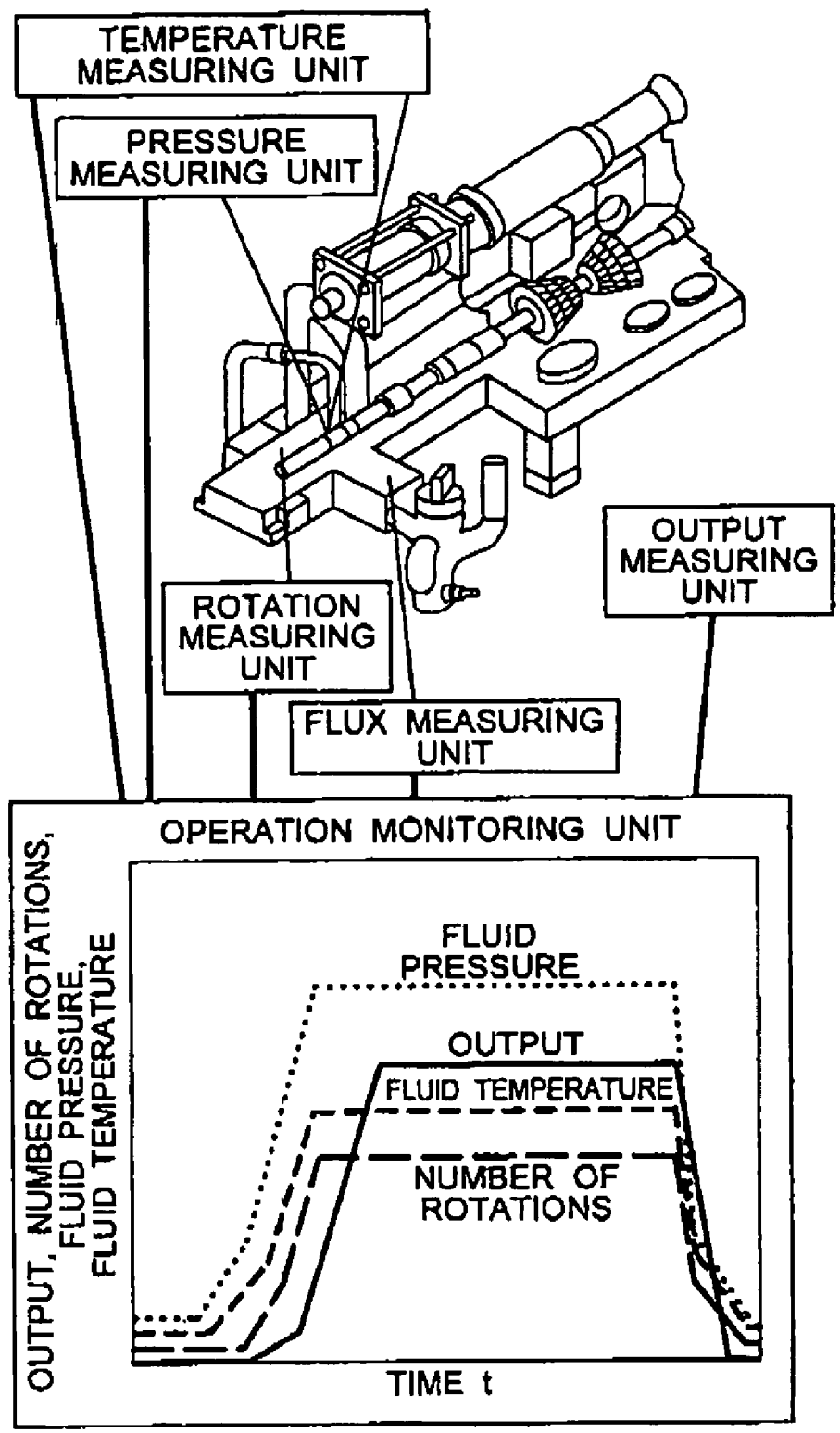
FIG. 4 is a diagram explaining an example where a breakdown monitoring unit is applied in a steam turbine in the first embodiment of this invention.

FIG. 4 depicts functions of the operation monitoring unit 3 in FIG. 1. As shown in the example of a steam turbine in FIG. 4, measurements from a temperature measuring unit, a pressure measuring unit, a rotation measuring unit, a flux measuring unit, and an output measuring unit, are applied to the operation monitoring unit 3, that thereby monitors the operations of the plant equipment.

The fluid pressure, fluid temperature, number of rotations, output, and the like, measured by the measuring units, are detected and processed online. The measuring units are realized by using conventional types of sensor such as a pressure gauge, a thermocouple, and a flux gauge.

Figure 5:
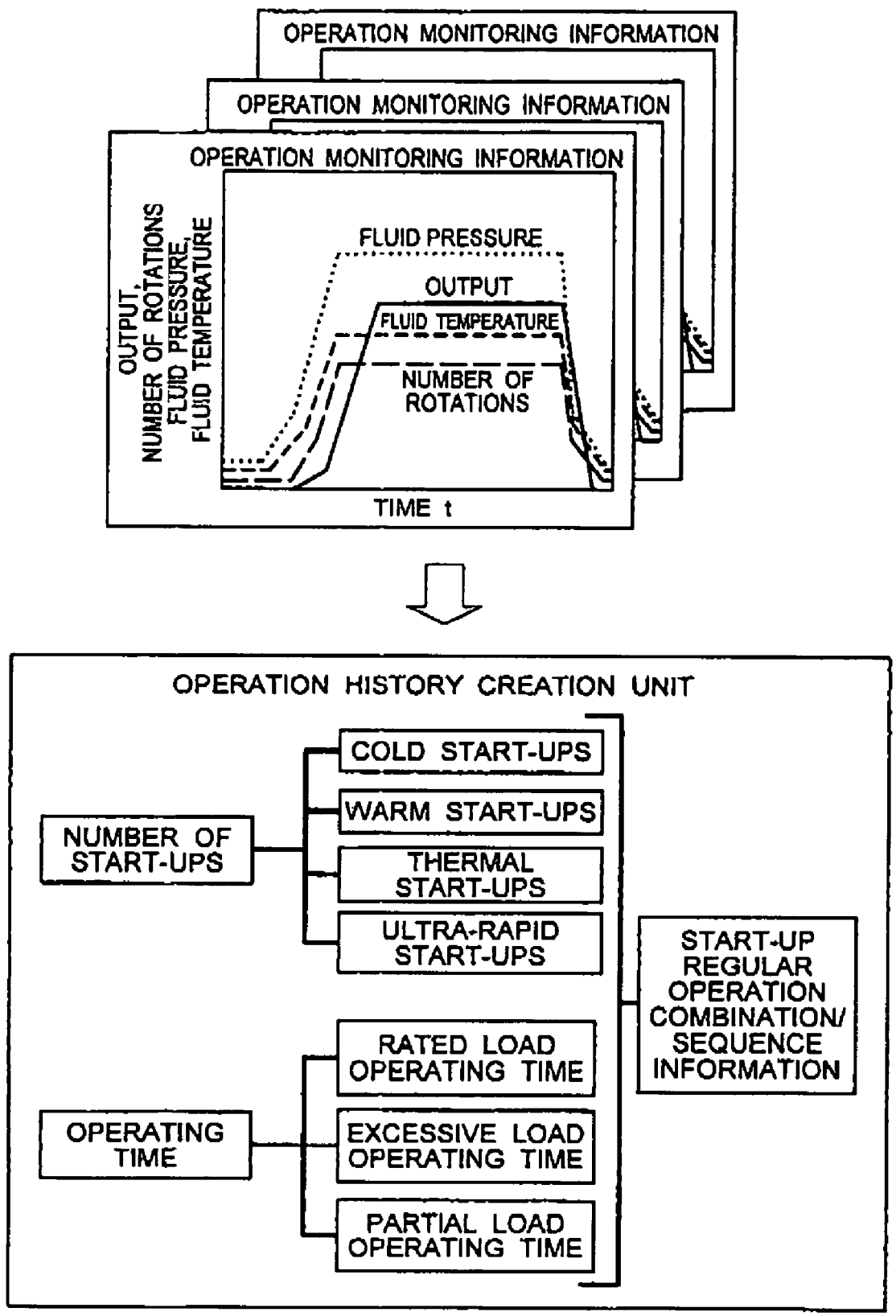
FIG. 5 is a diagram explaining an example of creating an operation history in the first embodiment of this invention.

FIG. 5 depicts the functions of the operation history creation unit 4 of FIG. 1. The operation history creation unit 4 receives operation monitoring information frequently, and categorizes each single operation from start-up to shutdown into a start-up/shutdown pattern category (cold start-up, warm start-up, thermal start-up, ultra-rapid start-up, etc.), separates the operations into rated load, excessive load, partial load, and the like during regular operation, and lists them in correspondence with their operating times. The information is arranged chronologically and stored as operation history data to be used in subsequent processing.

Figure 6:
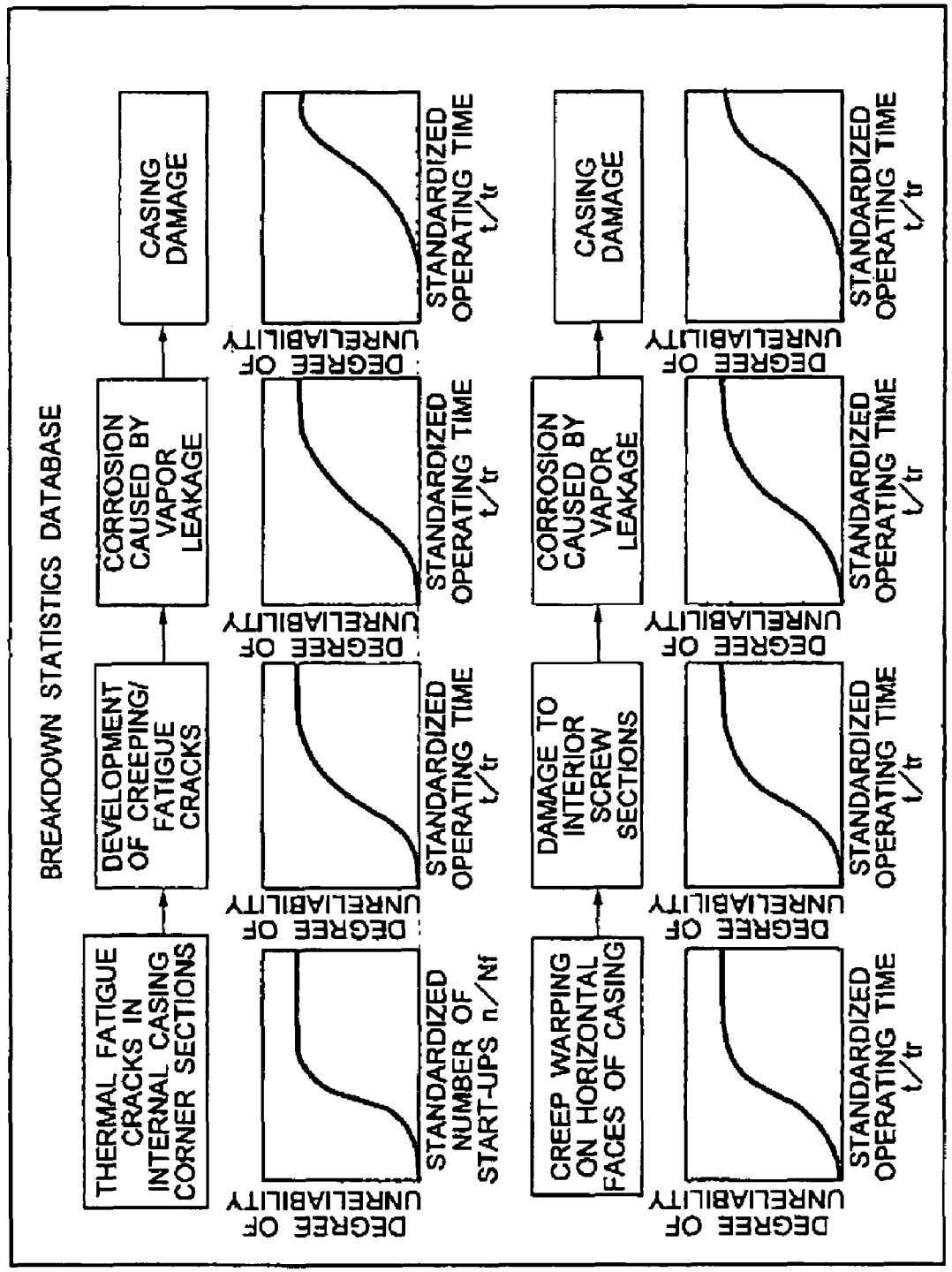
FIG. 6 is a diagram explaining an example of contents of a breakdown statistics database in the first embodiment of this invention.

FIG. 6 depicts the contents of the breakdown statistics database 5 of FIG. 1. As shown in the example of the steam turbine casing of FIG. 6, the breakdown statistics database 5 includes an event tree of breakdown events, that are arranged according to the order in which they occurred arid their causal relationships, and a degree of unreliability function is allocated to each event.

Degree of unreliability data that relates to the incidence and time of thermal fatigue cracks in internal casing corner sections, development of creeping/fatigue cracks, corrosion caused by vapor leakage, damage to casing, creep warping on the horizontal faces of the casing, and damage to interior screw sections, is stored in the breakdown statistics database 5.

When the degree of unreliability function uses the two values of a standardized number of start-ups n/Nf, where the low-cycle fatigue lifetime Nf of the target section is the denominator with respect to the number of start-ups n, or a standardized operating time t/tr, where the creep lifetime tr is the denominator with respect to operating time t, the degree of unreliability F for these values (i.e. the probability that a breakdown will occur in equipment that was operating normally until that point) is adjusted based on statistical analysis of data relating to previous breakdowns, in the plant equipment. Since Nf and tr are parameters that relate to operating states such as temperature, stress, and strain, they are configured so as to be applicable to different operating states.

Figure 7:
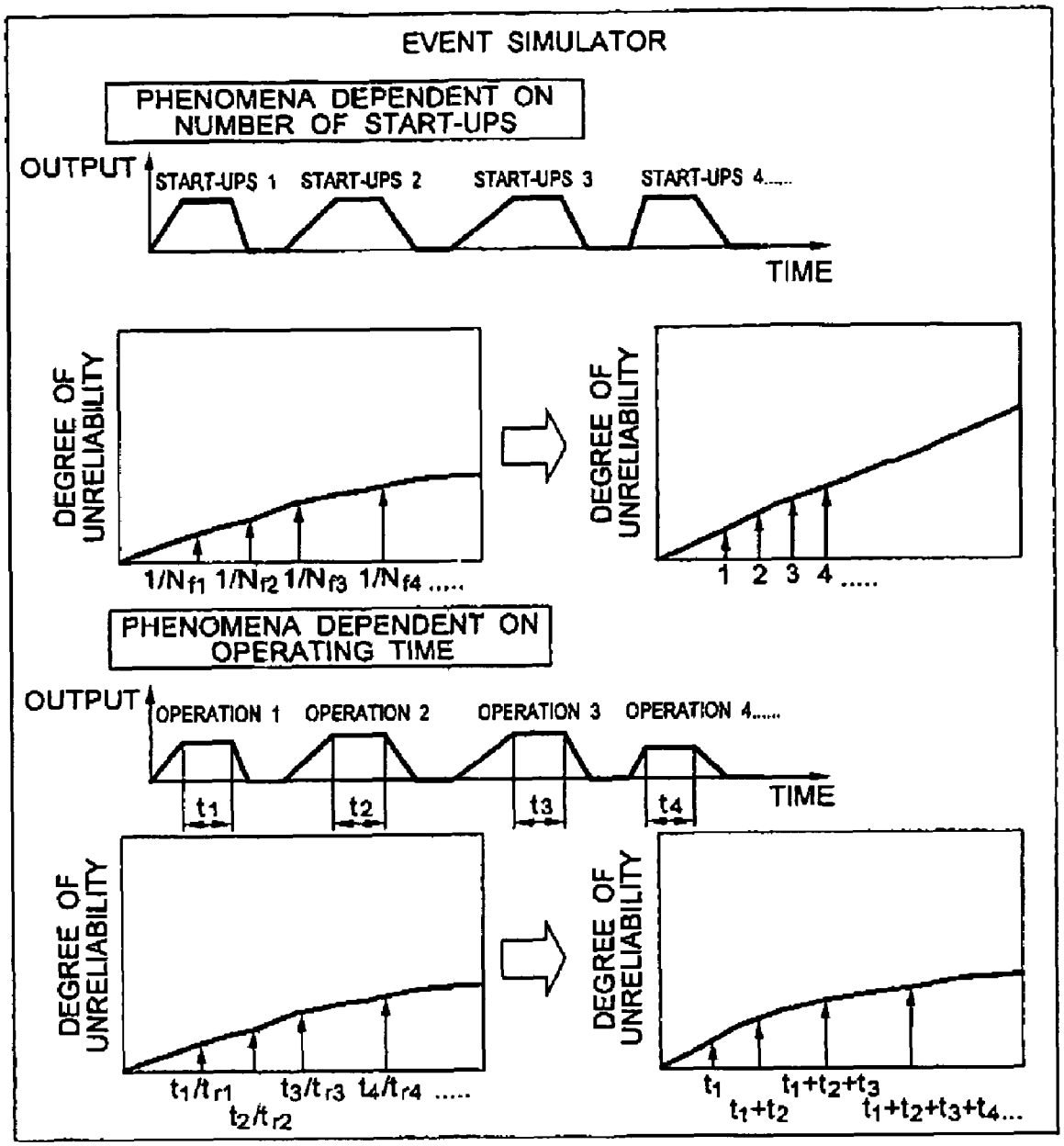
FIG. 7 is a diagram explaining an example of event simulation in the first embodiment of this invention.

FIG. 7 depicts the functions of the event simulator 6 of FIG. 1. As shown in FIG. 7, using the request operating parameters supplied by, the operating conditions setting unit 2, the operation histories supplied by the operation history creation unit 4, the event tree supplied by the breakdown statistics database 5, and the degree of unreliability function, the event simulator 6 reads the degree of unreliability for phenomena that are dependent on the number of start-ups, such as thermal fatigue, or phenomena that are dependent on time, such as creeping, by using the standardized number of start-ups and the standardized operating time, and determines the relationship between the degree of unreliability and the number of start-ups/operating time.

Figure 8:
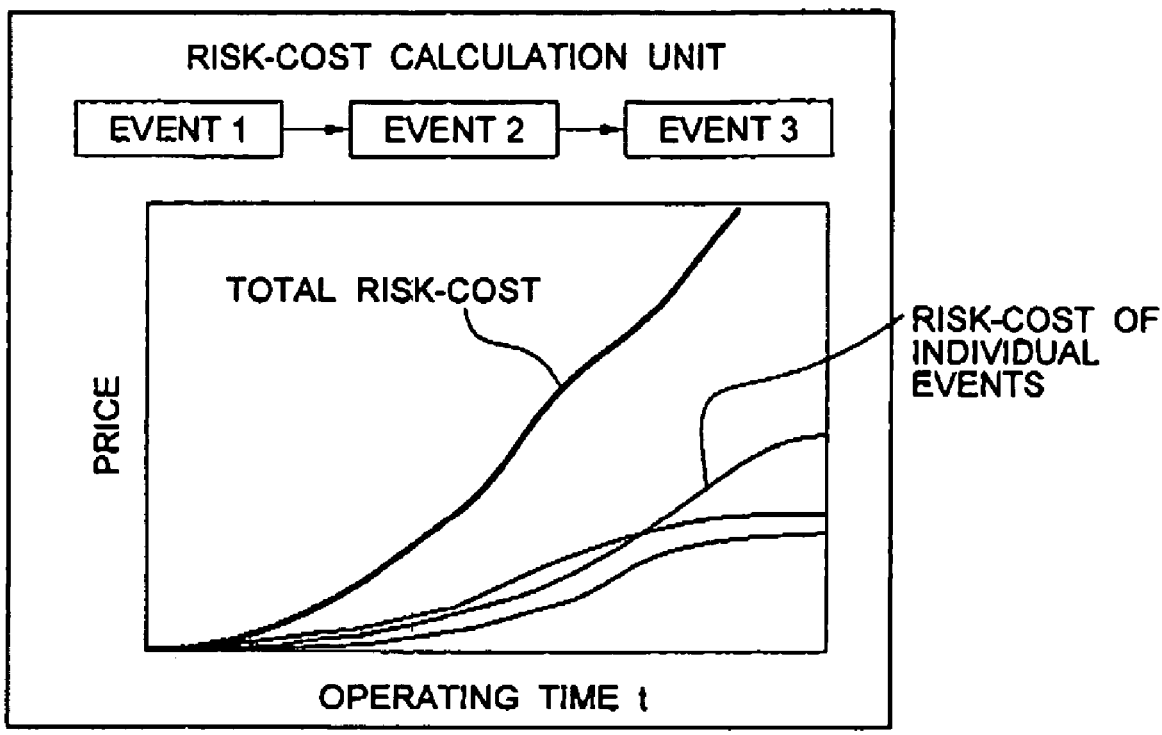
FIG. 8 is a diagram explaining an example of calculating risk-cost in the first embodiment of this invention.

FIG. 8 depicts the functions of the risk-cost calculation unit 7 in FIG. 1. As shown in FIG. 8, the risk-cost calculation unit 7 uses the results of the simulation made by the event simulator 6 to add up risk-costs, obtained by applying a restoration cost to the degree of unreliability function of each event, for every item in the event tree, and determines the total risk-cost for the operating time/number of start-ups.

Figure 9:
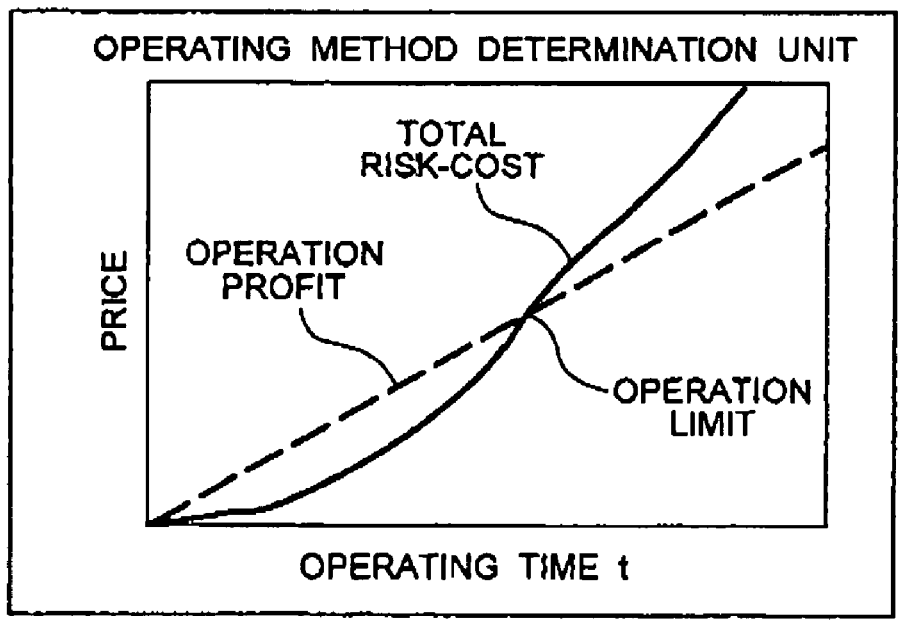
FIG. 9 is a diagram explaining an example of determining an operating method in the first embodiment of this invention.

FIG. 9 depicts the functions of the operating method determination unit 8 of FIG. 1. As shown in FIG. 9, the operating method determination unit 8 compares the total risk-cost function with the profit obtained by the requested operation, and deems possible an operation that maximizes the profit without exceeding the risk-cost.

When the operating method determination unit 8 determines that operation is not possible under the requested operating conditions, the operating conditions are made easier, and this corrected version is fed back to the event simulator 6. By repeating this calculation, the operating method determination unit 8 selects an operating method under conditions that are as close as possible to the operation request. The operating method specification unit 9 specifies the possible operating method that is nearest to the operation request.

As described above in the first embodiment, in response to a request to operate plant equipment, a possible operating method is selected by calculating its risk-cost in real time and comparing the risk-cost with the profit that will be derived from the operation. Therefore, the plant can be operated with maximum profit while maintaining safety.

EMBODIMENT 2

Figure 10:
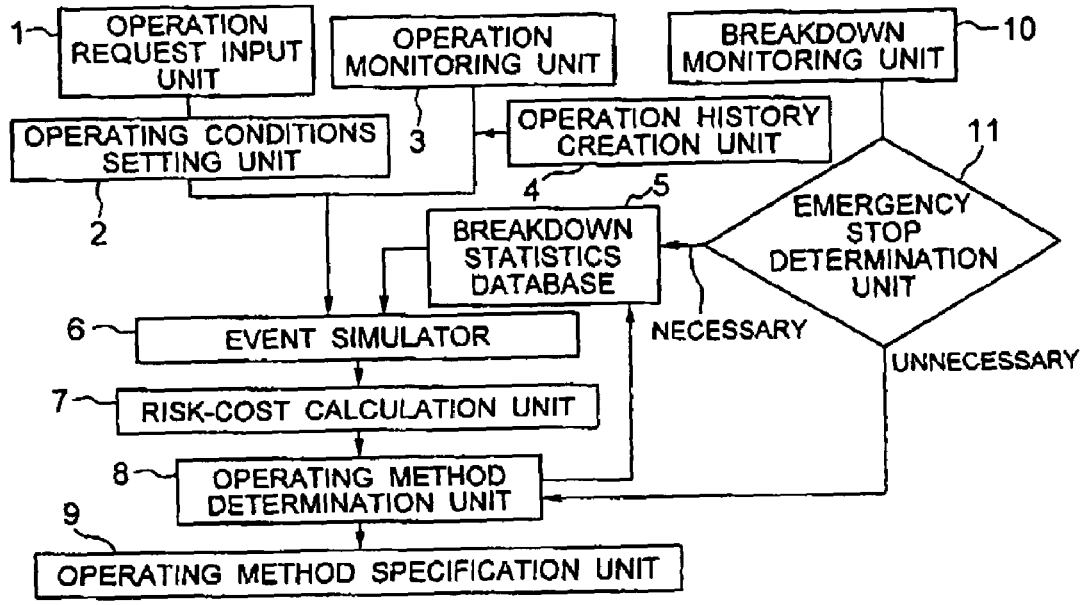
FIG. 10 is a block line diagram of the constitution of a second embodiment of this invention.

FIG. 10 depicts the constitution of a second embodiment of this invention. The second embodiment adds a breakdown monitoring unit 10 to the first embodiment.

Figure 11:
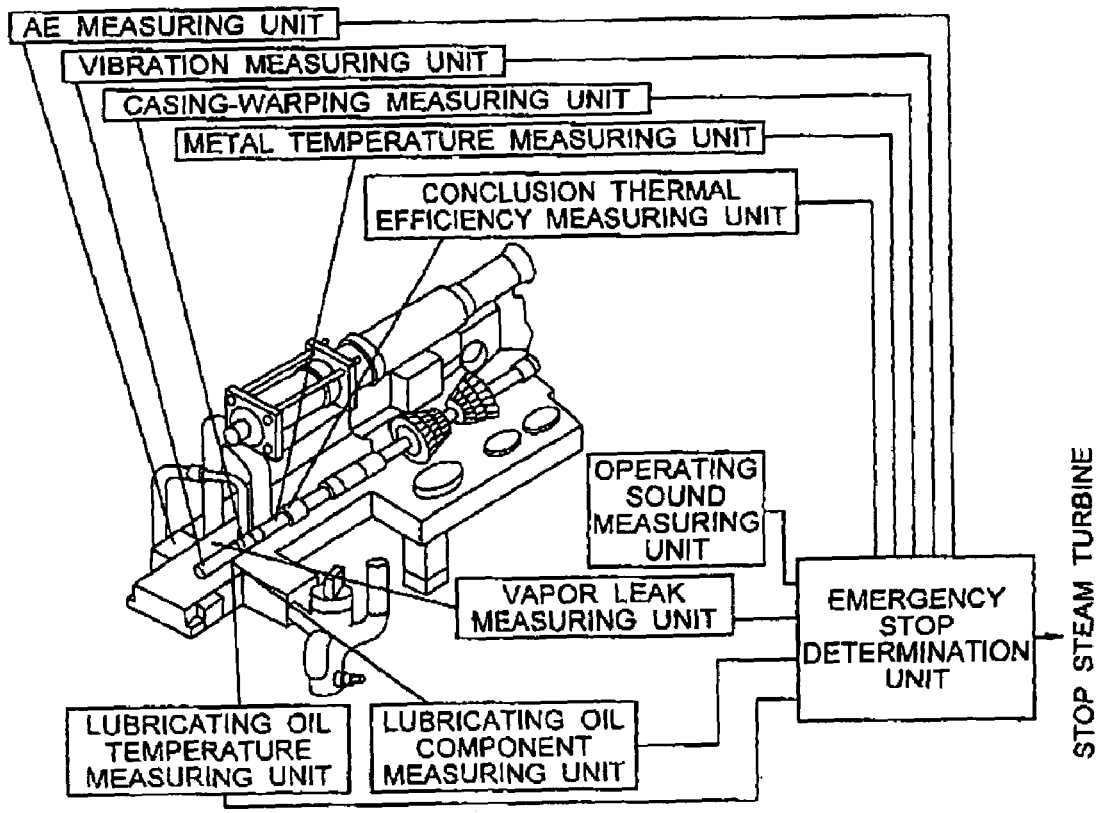
FIG. 11 is a diagram explaining an example where a breakdown monitoring unit is applied in a steam turbine in the second embodiment of this invention.

FIG. 11 depicts the functions of the breakdown monitoring unit 10. As shown by the example of a steam turbine in FIG. 11, the breakdown monitoring unit 10 includes a casing-warping measuring unit, a conclusion thermal efficiency measuring unit, a metal temperature measuring unit, a vibration measuring unit, an AE measuring unit, a lubricating oil temperature measuring unit, a lubricating oil component measuring unit, a vapor leak measuring unit, an operating sound measuring unit, and such like.

These measuring units can be realized by providing, where necessary, sensors such as a thermocouple, a gap sensor, a displacement gauge, an acceleration gauge, a thermometer, an analyzing device, a parabolic device, and an acoustic emission device, that detect member temperature, warping/displacement, vibration, lubricating oil temperature, changes in lubricating oil components, partial thermal efficiency, plant efficiency, operational fluid leaks, operation sound changes, and the like, of plant equipment. The signals from the sensors are monitored online to detect breakdown events and precursory breakdown events.

When, a breakdown event occurs, an emergency stop determination unit 11 shown in FIG. 10 determines whether an emergency stop is necessary based on a comparison with a predetermined threshold, and, if so, sends this information to the operating method determination unit 8, and the operating method specification unit 9 outputs a stop signal.

When an emergency stop is deemed necessary, information relating to the occurrence of the breakdown event or precursory breakdown event is transmitted to the breakdown statistics database 5, where the pre-event probability of the subsequent event that follows the breakdown event is substituted with a post-event probability. This post-event degree of unreliability function is used in the processing of the event simulator 6 in the same manner as in the first embodiment.

As described above in the second embodiment, in response to a request to operate plant equipment, a possible operating method is selected by calculating its risk-cost in real time and comparing the risk-cost with the profit that will be gained from performing the operation. In addition, the occurrence of breakdown events and precursory breakdown events is monitored. Therefore, the plant can be operated with maximum profit while maintaining safety, even when an event occurs.

EMBODIMENT 3

Figure 12:
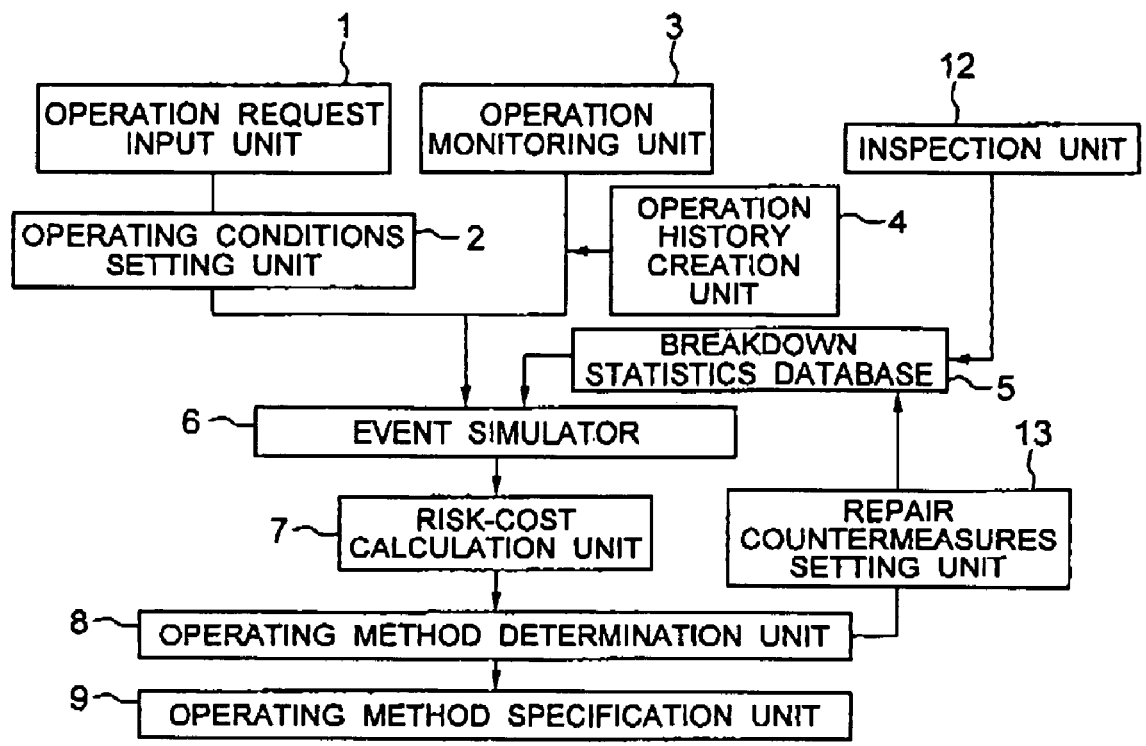
FIG. 12 is a block line diagram of the constitution of a third embodiment of this invention.

FIG. 12 depicts the constitution of a third embodiment, of this invention. The third embodiment adds an inspection unit 12 to the first embodiment.

Figure 13:
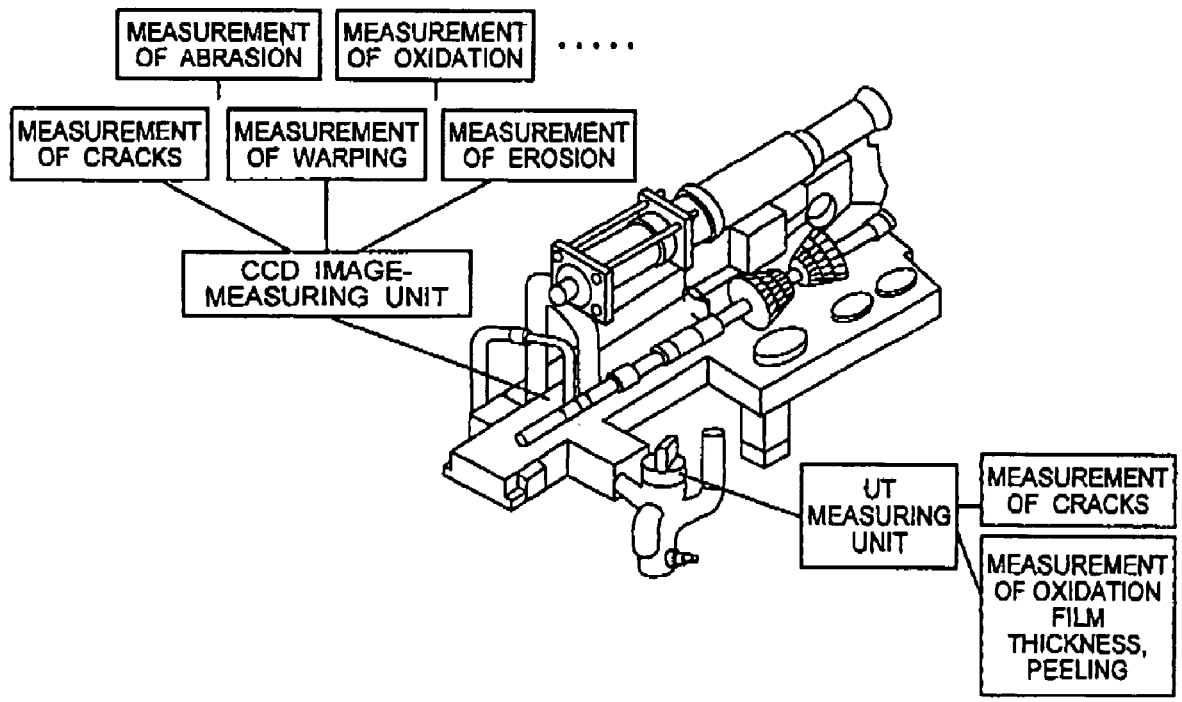
FIG. 13 is a diagram explaining an example where a breakdown monitoring unit is applied in a steam turbine in the third embodiment of this invention.

FIG. 13 depicts the constitution of the inspection unit 12. As shown in the example of the stream turbine in FIG. 13, the inspection unit 12 uses an image measuring unit fitted with a CCD camera to measure all or some of cracks, warping/displacement, erosion, abrasion, oxidation, corrosion, breakage, and deterioration/damage of plant constitutional equipment. The inspection unit 12 uses methods such as a UT measuring unit and the like fitted with an ultrasonic sensor that measures peeling, cracks, and the thickness of oxidation film, to inspect the equipment after disassembling it or by remote access without disassembling it.

When the inspection results show that an event is occurring, the degree of unreliability of the subsequent event that follows the occurring event in the breakdown statistics database 5 is substituted with a post-event degree of unreliability, and processing is executed from the event simulator 6 onwards.

When operation cannot continue due to the occurrence of an event or a subsequent event, the operating method determination unit 8 determines that repair work is required, and selects a necessary repair method such as filling-in of cracks, welding, thermal processing, coating, component replacement, and the like.

The event and its subsequent event in the breakdown statistics database 5 are restored by the repair work, and are reset to pre-event probabilities. Processing from the event simulator 6 onwards is executed, specifying an operating method that incorporates the repair work.

Figure 14:
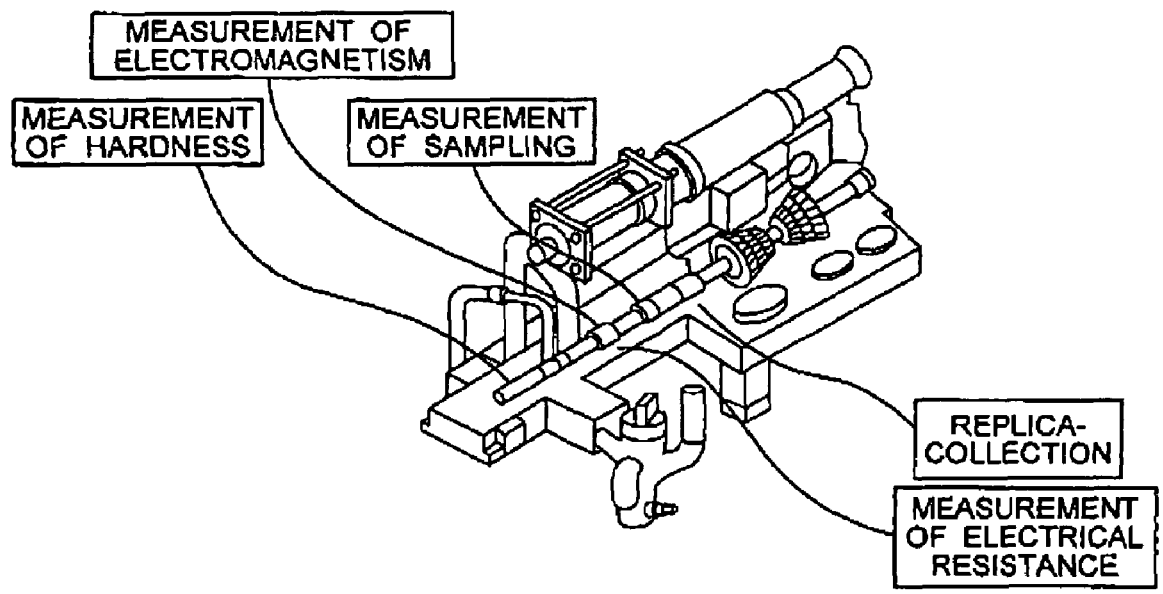
FIG. 14 is a diagram explaining an example where a deterioration damage measuring unit is applied in a steam turbine in the third embodiment of this invention.

FIG. 14 explains an example where a deterioration/damage measuring unit is used as the inspection unit of the third embodiment, applied in a stream turbine.

In this embodiment, all or some of a hardness measuring unit, an electromagnetism measuring unit, a sampling unit, a replica-collecting unit, and an electric resistance measuring unit, that measure softening, fragility, creep void, cracks, deformation, and warping, of equipment members, are used as the deterioration/damage measuring unit.

Figure 15:
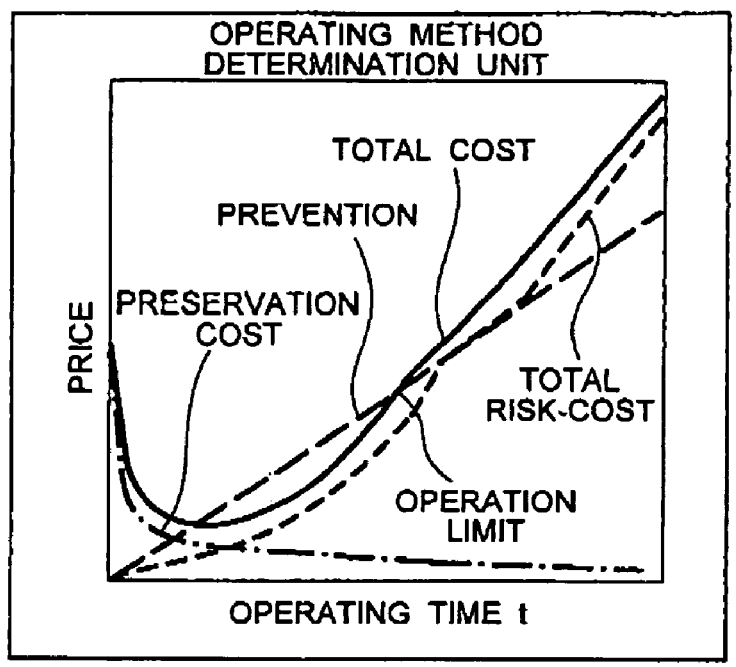
FIG. 15 is a diagram explaining an example of determining an operating method in the third embodiment of this invention.

FIG. 15 depicts the functions of the operating method determination unit 8. When performing repair, the operating method determination unit 8 compares the profit of continuing operation with the sum of the risk-cost and the repair cost (treating the repair interval as time so as to obtain a diminishing function of time).

As described above in the third embodiment, in response to a request to operate plant equipment, repairs are made and risk-cost is calculated based on inspection, the evaluation taking repairs into consideration. Therefore, even when an event occurs while aiming to achieve the most profitable operation that incorporates preservation maintenance based on inspection and repair, the plant can operate with maximum profit while maintaining safety,

EMBODIMENT 4

Figure 16:
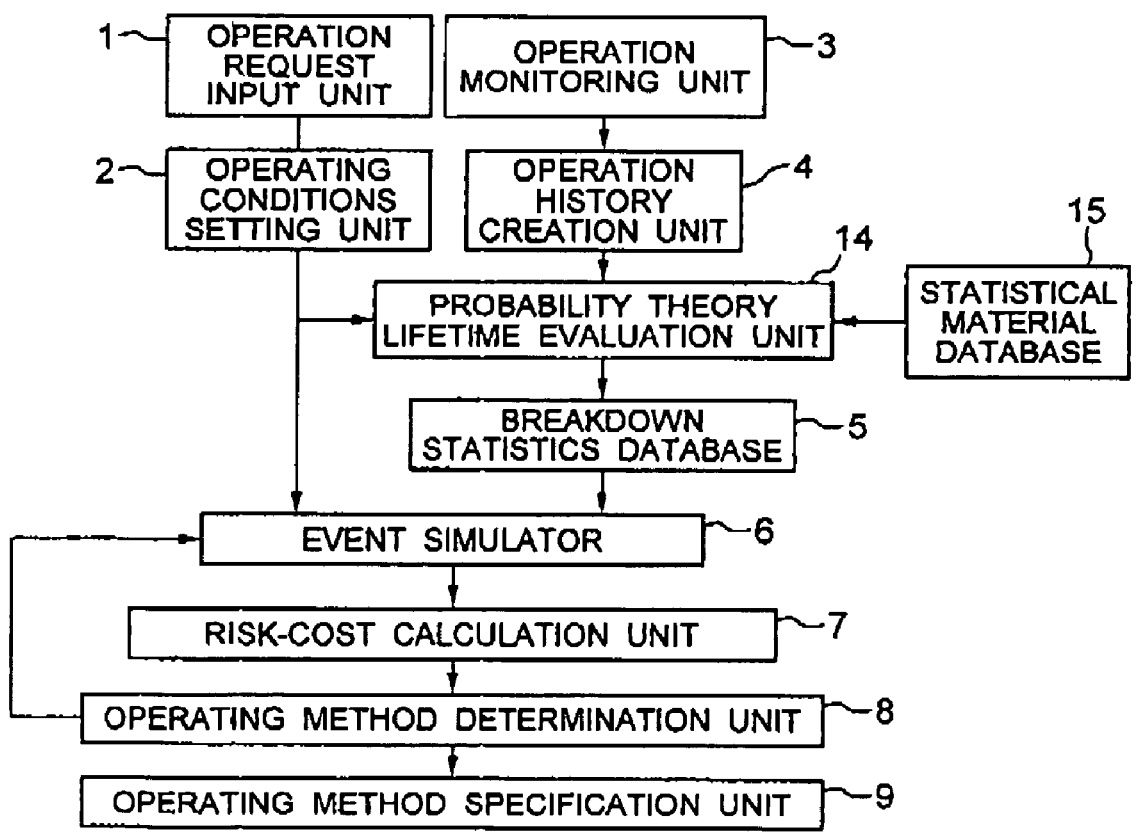
FIG. 16 is a block line diagram of the constitution of a fourth embodiment of this invention.

FIG. 16 depicts the constitution of a fourth embodiment of this invention. The fourth embodiment adds a probability theory lifetime evaluation unit 14 to the first embodiment. The relationship between the lifetime (operating time/number of start-ups) and the degree of unreliability is calculated for operating conditions of temperature, stress, and warping, based on the operation history created by the operation history creation unit 4, the operating conditions set by the operating conditions setting unit 2, material lifetime characteristics, such as creeping and fatigue, stored beforehand in a statistical material database 15, and the probability distribution thereof.

Figure 17:
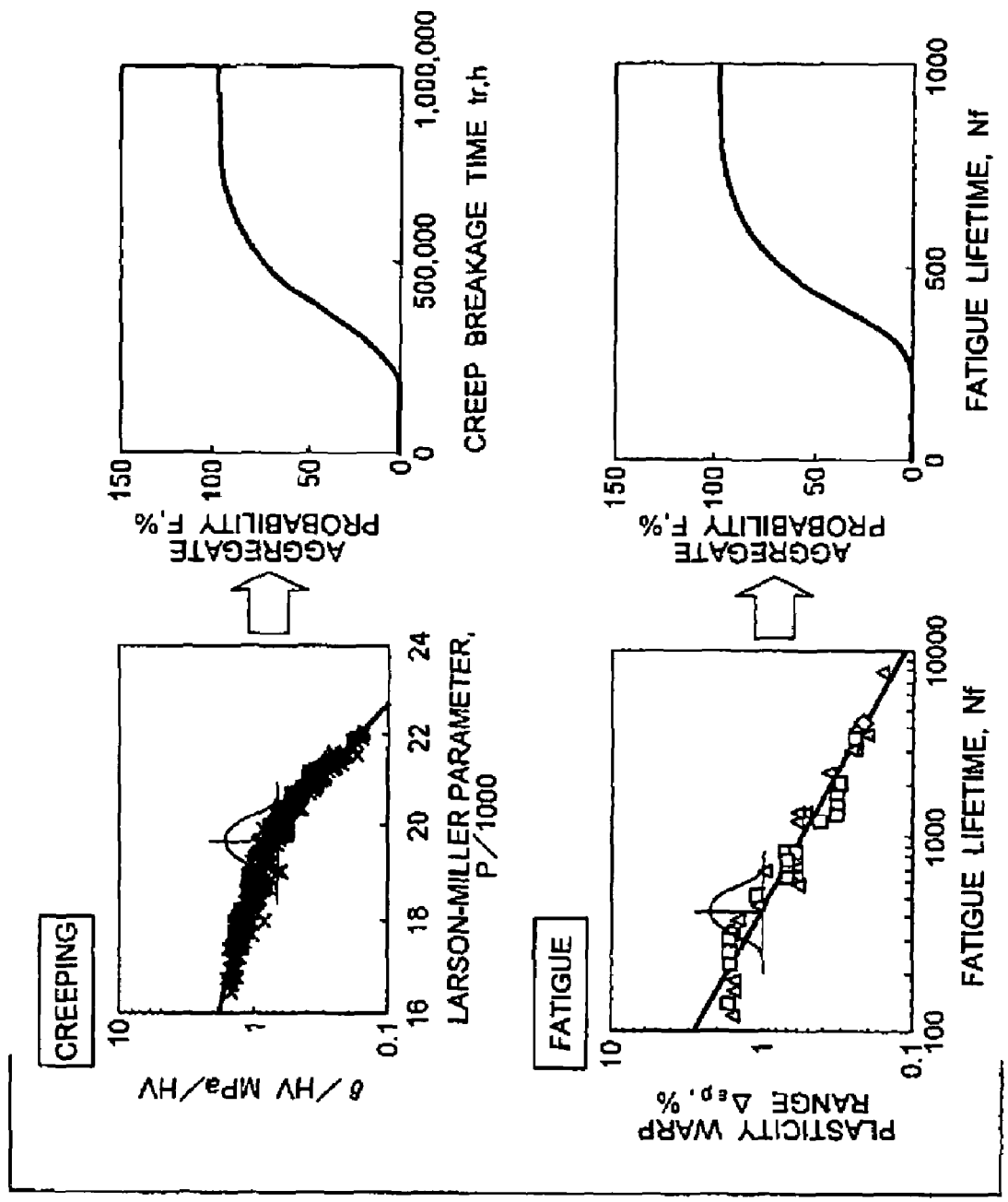
FIG. 17 is a diagram explaining an example of probability theory lifetime evaluation in the fourth embodiment of this invention.

FIG. 17 is an example of statistical distribution of material lifetime for creeping and fatigue, converted to a degree of unreliability function. The degree of unreliability function calculated in this manner is added to the breakdown statistics database 5, and the processing from the event simulator 6 onwards is executed.

As described above in the fourth embodiment, in response to a request to operate plant equipment, risk-cost is calculated and repairs are made based on lifetime evaluation. This incorporates consideration of breakdown caused by accumulative damage that results from creeping and fatigue, enabling the plant to operate safely and at maximum profit.

EMBODIMENT 5

Figure 18:
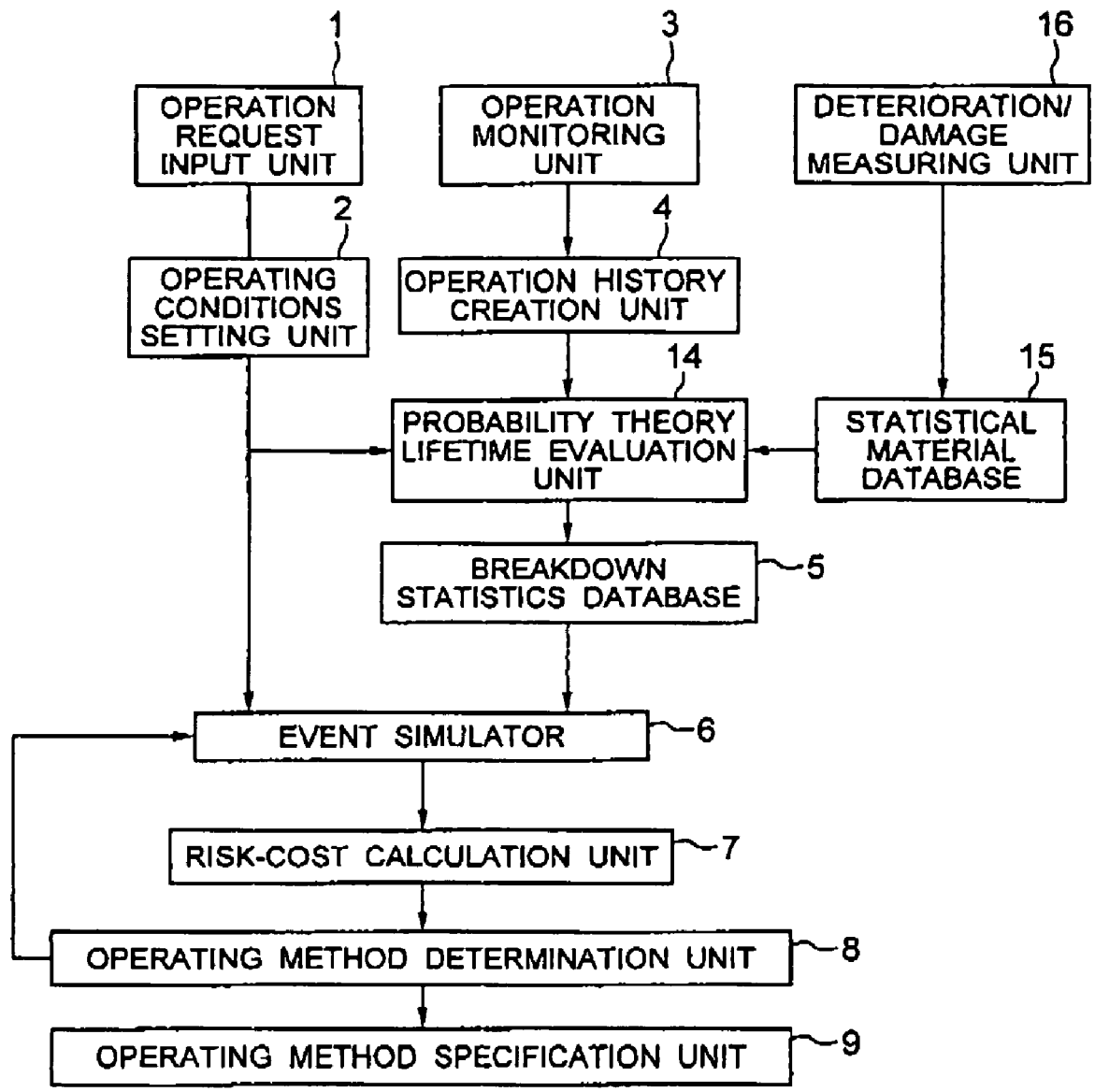
FIG. 18 is a block line diagram of the constitution of a fifth embodiment of this invention.

FIG. 18 depicts the constitution of a fifth embodiment of this invention. The fifth embodiment adds a deterioration damage measuring unit 16 to the fourth embodiment. The deterioration damage measuring unit 16 measures time-induced softening, fragility, creep void, cracks, deformation, and warping, of members by using a hardness measuring unit, an electromagnetism measuring unit (overcurrent device), a sampling unit, a replica-collecting unit, an electrical resistance measuring unit, and the like. The deterioration damage measuring unit 16 detects degrees of time-induced deterioration and damage of materials, and evaluates the occurrence/development of cracks that are caused by creeping and fatigue. The deterioration damage measuring unit 16 determines the degree of unreliability function by making a probability theory lifetime evaluation, such as that shown in FIG. 4.

As described above in the fifth embodiment, in response to a request to operate plant equipment, the states of equipment members are detected by measuring deterioration and damage, and then repairs are made and the risk-cost is calculated based on a lifetime evaluation. In the case of a plant that has been used for some time, consideration can be given to breakdown resulting accumulative damage caused by creeping and fatigue, enabling the plant to operate safely and at maximum profit.

EMBODIMENT 6

Figure 19:
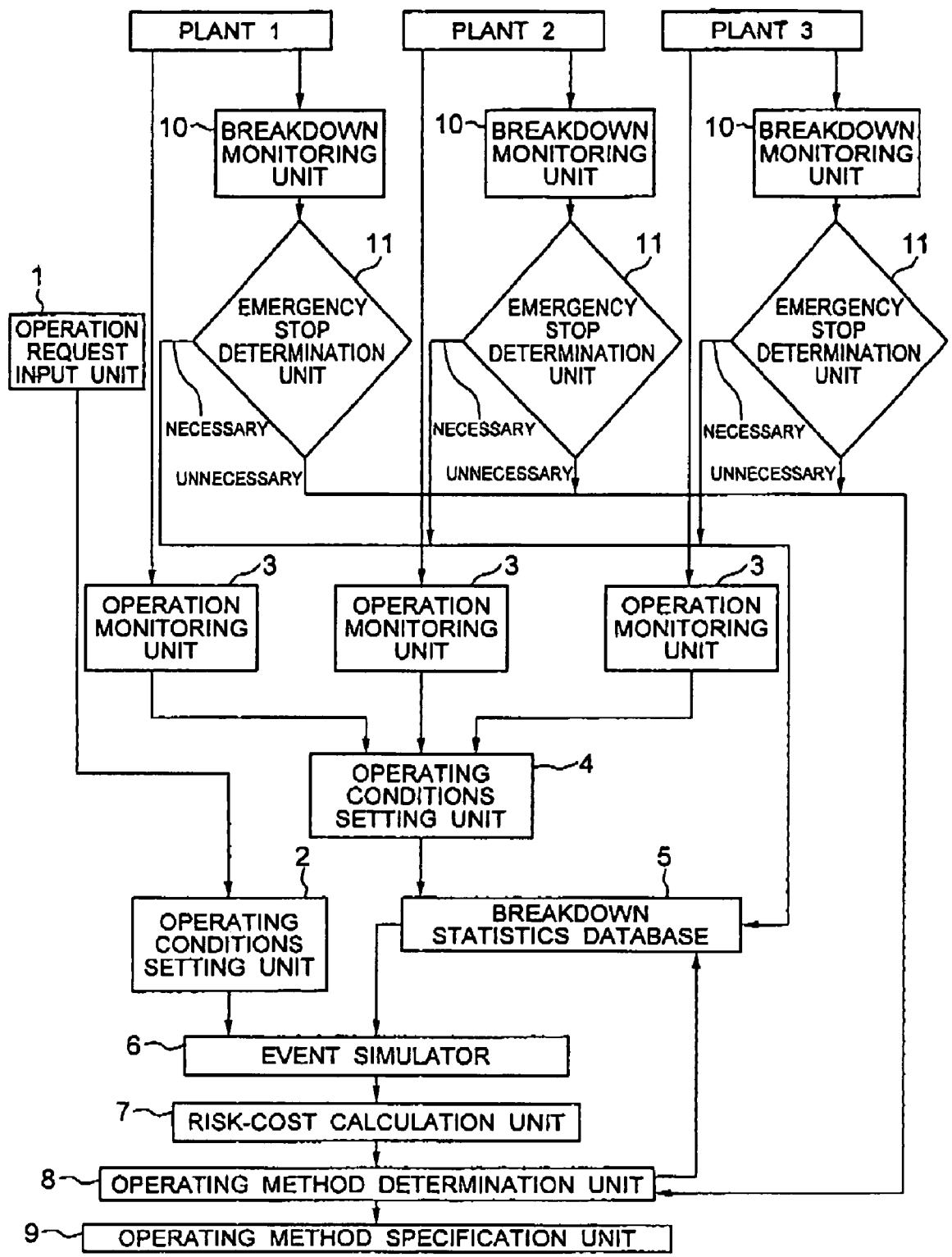
FIG. 19 is a block line diagram of the constitution of a sixth embodiment of this invention.

FIG. 19 depicts, the constitution of a sixth embodiment of this invention. In the sixth embodiment, a plurality of operation monitoring units 3 and breakdown monitoring units 10 are provided for respective plants, and information from them is received via a network. The operation request input unit 1 is also joined to the network, so that necessary requests can be input while referring to the plant information.

Risk-costs are calculated for the plurality of plants, and operating methods are determined based on the total cost. The event simulator 6 changes and combines the operating patterns of the plants, selecting those that will achieve maximum profit or minimal cost.

As described above in the sixth embodiment, since information from the plurality of plants and units is processed together, the plants can be operated in an optimal combination of methods that will minimize cost or maximize profit.

INDUSTRIAL APPLICABILITY

In the present invention, an operating method is selected based on an evaluation of the risk-cost while monitoring the operation of a plant. This enables the optimal operating method, that reduces the cost of plant preservation management and maximizes the profit gained from plant operations, to be provided in real time, and enables energy to be used effectively.

What is claimed is:

1. An operation-supporting apparatus for plant equipment, comprising:

an operation request input unit that inputs operation request input information, the operation request input information including information relating to operation request items of the plant equipment;

an operating conditions setting unit that converts the operation request input information to operating parameters;

an operation history creation unit that creates an operation history by chronologically processing the operating parameters, converted by the operating conditions setting unit, based on input from an operation monitoring unit that monitors operating states of the plant equipment;

a breakdown statistics database that stores an event tree of the plant equipment in correlation with degrees of unreliability relating to breakdown events;

an event simulator that calculates a degree of unreliability corresponding to the operating parameters, based on the information in the breakdown statistics database, the operation request input information, and the operation history, and in compliance with the event tree of the plant equipment;

a risk-cost calculation unit that calculates risk-cost by determining an aggregate product of the degrees of unreliability and restoration costs in compliance with the event tree;

an operating method determination unit that determines whether operating conditions are suitable by comparing the risk-cost with profit that is expected to be gained by continuing operation; and an operating method specification unit that specifies specific operation conditions for the plant equipment in accordance with an operating method determined by the operating method determination unit;

wherein the operation monitoring unit includes detectors that detect all or some signals relating to temperature and pressure of operational fluids of the plant equipment, a number of rotations of rotating parts, and output load, chronologically processes the detected signals, arranges regular and irregular operations into predetermined categories, and collects and stores data that relates to a number of start-ups and operating times;

wherein the event tree stored by the breakdown statistics database is based on previous breakdown events in the plant and/or other similar plants and relates to cracks, deformation, erosion, abrasion, oxidation, corrosion, deterioration of materials, breakage, reduced capability, and functional deterioration, and a degree of unreliability function for each event, these being expressed as a function of material lifetime parameters in correspondence with operation conditions, or as a function of parameters of temperature, stress, warping, and environmental factors, that represent operating conditions;

the apparatus further comprising a breakdown monitoring unit that detects the breakdown events while the plant equipment is operational and precursory breakdown events; and an emergency stop determination unit that determines whether to stop operation immediately based on a detection signal detected by the breakdown monitoring unit; and wherein, when not immediately stopping operation, a probability of an event that already occurred in the event tree stored in the breakdown statistics database is corrected from a pre-event probability to a post-event probability, and in addition, a subsequent event is corrected by using the post-event probability of the event that already occurred, and the event simulator uses a corrected degree of unreliability.

2. The operation-supporting apparatus for plant equipment according to claim 1, wherein the breakdown monitoring unit detects all or some of member temperature, warping/displacement, vibration, lubricating oil temperature, changes in lubricating oil components, partial thermal efficiency, plant efficiency, operational fluid leaks, operation sound, and acoustic emission signals, of plant equipment, and sends information, that indicates whether the breakdown event or the precursory breakdown event has occurred, to the emergency stop determination unit and the breakdown statistics database.

3. The operation-supporting apparatus for plant equipment according to claim 1, further comprising an inspection unit that inspects breakdown events and precursory breakdown events of equipment members while the plant equipment has stopped operating; and wherein information relating to the occurrence of the breakdown events and the precursory breakdown events detected by the inspection unit is transmitted to the breakdown statistics database, the degree of unreliability function is corrected to post-event probability, and, in cases where the operating method determination unit determines that operation cannot restart and that operation is possible only under certain conditions, a repair method is selected, the degree of unreliability in the breakdown statistics database being changed when the repair method has been carried out, another simulation is executed and the operating method determination unit makes a determination.

4. The operation-supporting apparatus for plant equipment according to claim 3, wherein the inspection unit uses all or some of a CCD camera, an ultrasonic sensor, an electric resistance sensor, and an electromagnetism sensor, to measure all or some of the cracks, warping/displacement, erosion, abrasion, oxidation, corrosion, and breakage, of the plant equipment.

5. The operation-supporting apparatus for plant equipment according to claim 1, further comprising a probability theory lifetime evaluation unit that calculates a lifetime evaluation by appending probabilities to lifetimes of the plant equipment with respect to creeping and fatigue by using material lifetime characteristics, stored beforehand in a statistical material database, and a probability distribution thereof, based on the operation history and the operation request input information that relates to the plant equipment,
the degree of unreliability function being calculated from the lifetime evaluation, determined by the probability theory lifetime evaluation unit, stored in the breakdown statistics database, and used in calculations made by the event simulator.

6. The operation-supporting apparatus for plant equipment according to claim 5, further comprising a deterioration/damage measuring unit that calculates values for material deterioration and material damage of equipment members while the plant equipment has stopped operating,
statistical material data, that is required in evaluation processing of the probability theory lifetime evaluation unit, being determined from the deterioration/damage values obtained from the deterioration/damage measuring unit.

7. The operation-supporting apparatus for plant equipment according to claim 6, wherein the deterioration/damage measuring unit uses all or some of a hardness measuring unit, an electromagnetism measuring unit, a sampling unit, a replica-collecting unit, and an electric resistance measuring unit, to measure softening, fragility, creep void, cracks, deformation, and warping, of the equipment members.

8. An operation-supporting apparatus for plant equipment, comprising:
an operation request input unit that inputs operation request input information, the operation request input information including information relating to operation request items of the plant equipment;
an operating conditions setting unit that converts the operation request input information to operating parameters;
an operation history creation unit that creates an operation history by chronologically processing the operating parameters, converted by the operating conditions setting unit, based on input from an operation monitoring unit that monitors operating states of the plant equipment;
a breakdown statistics database that stores an event tree of the plant equipment in correlation with degrees of unreliability relating to breakdown events;
an event simulator that calculates a degree of unreliability corresponding to the operating parameters, based on the information in the breakdown statistics database, the operation request input information, and the operation history, and in compliance with the event tree of the plant equipment;
a risk-cost calculation unit that calculates risk-cost by determining an aggregate product of the degrees of unreliability and restoration costs in compliance with the event tree;
an operating method determination unit that determines whether operating conditions are suitable by comparing the risk-cost with profit that is expected to be gained by continuing operation;
an operating method specification unit that specifies specific operation conditions for the plant equipment in accordance with an operating method determined by the operating method determination unit; and
a breakdown monitoring unit that detects the breakdown events while the plant equipment is operational and precursory breakdown events; and an emergency stop determination unit that determines whether to stop operation immediately based on a detection signal detected by the breakdown monitoring unit;
wherein, when not immediately stopping operation, a probability of an event that already occurred in the event tree stored in the breakdown statistics database is corrected from a pre-event probability to a post-event probability, and in addition, a subsequent event is corrected by using the post-event probability of the event that already occurred, and the event simulator uses a corrected degree of unreliability.

9. The operation-supporting apparatus for plant equipment according to claim 8, wherein the operation monitoring unit includes detectors that detect all or some signals relating to temperature and pressure of operational fluids of the plant equipment, a number of rotations of rotating parts, and output load, chronologically processes the detected signals, arranges regular and irregular operations into predetermined categories, and collects and stores data that relates to a number of start-ups and operating times.

10. The operation-supporting apparatus for plant equipment according to claim 8, wherein the event tree is based on previous breakdown events in the plant and/or other similar plants and relates to cracks, deformation, erosion, abrasion, oxidation, corrosion, deterioration of materials, breakage, reduced capability, and functional deterioration, and a degree of unreliability function for each event, these being expressed as a function of material lifetime parameters in correspondence with operation conditions, or as a function of parameters of temperature, stress, warping, and environmental factors, that represent operating conditions.

11. The operation-supporting apparatus for plant equipment according to claim 8, wherein the breakdown monitoring unit detects all or some of member temperature, warping/displacement, vibration, lubricating oil temperature, changes in lubricating oil components, partial thermal efficiency, plant efficiency, operational fluid leaks, operation sound, and acoustic emission signals, of plant equipment, and sends information, that indicates whether the breakdown event or the precursory breakdown event has occurred, to the emergency stop determination unit and the breakdown statistics database.

12. The operation-supporting apparatus for plant equipment according to claim 8, further comprising an inspection unit that inspects breakdown events and precursory breakdown events of equipment members while the plant equipment has stopped operating; and wherein information relating to the occurrence of the breakdown events and the precursory breakdown events detected by the inspection unit is transmitted to the breakdown statistics database, the degree of unreliability function is corrected to post-event probability, and, in cases where the operating method determination unit determines that operation cannot restart and that operation is possible only under certain conditions, a repair method is selected, the degree of unreliability in the breakdown statistics database being changed when the repair method has been carried out, another simulation is executed and the operating method determination unit makes a determination.

13. The operation-supporting apparatus for plant equipment according to claim 12, wherein the inspection unit uses all or some of a CCD camera, an ultrasonic sensor, an electric resistance sensor, and an electromagnetism sensor, to measure all or some of the cracks, warping/displacement, erosion, abrasion, oxidation, corrosion, and breakage, of the plant equipment.

14. The operation-supporting apparatus for plant equipment according to claim 8, further comprising a probability theory lifetime evaluation unit that calculates a lifetime evaluation by appending probabilities to lifetimes of the plant equipment with respect to creeping and fatigue by using material lifetime characteristics, stored beforehand in a statistical material database, and a probability distribution thereof, based on the operation history and the operation request input information that relates to the plant equipment, the degree of unreliability function being calculated from the lifetime evaluation, determined by the probability theory lifetime evaluation unit, stored in the breakdown statistics database, and used in calculations made by the event simulator.

15. The operation-supporting apparatus for plant equipment according to claim 14, further comprising a deterioration/damage measuring unit that calculates values for material deterioration and material damage of equipment members while the plant equipment has stopped operating, statistical material data, that is required in evaluation processing of the probability theory lifetime evaluation unit, being determined from the deterioration/damage values obtained from the deterioration/damage measuring unit.

16. The operation-supporting apparatus for plant equipment according to claim 15, wherein the deterioration/damage measuring unit uses all or some of a hardness measuring unit, an electromagnetism measuring unit, a sampling unit, a replica-collecting unit, and an electric resistance measuring unit, to measure softening, fragility, creep void, cracks, deformation, and warping, of the equipment members.

* * * * *

UNITED STATES PATENT AND TRADEMARK OFFICE
CERTIFICATE OF CORRECTION

| | |
|---|---|
| PATENT NO. | : 7,283,929 B2 |
| APPLICATION NO. | : 10/525754 |
| DATED | : October 16, 2007 |
| INVENTOR(S) | : Fujiyama et al. |

Page 1 of 1

It is certified that error appears in the above-identified patent and that said Letters Patent is hereby corrected as shown below:

Title page, item (22), change "Filed: Sep. 26, 2005" to --PCT Filed: Aug. 29, 2003--.

Title page, column 1, below item (22), insert the following:

--(86)  PCT No.: PCT/JP2003/011102

§371(c)(1), (2), (4) Date: Sep. 26, 2005

(87)  PCT Pub. No.: WO2004/021097

PCT Pub. Date: Mar. 11, 2004--

Signed and Sealed this

Twenty-first Day of October, 2008

JON W. DUDAS
*Director of the United States Patent and Trademark Office*